United States Patent
Endo et al.

(10) Patent No.: US 8,370,145 B2
(45) Date of Patent: Feb. 5, 2013

(54) DEVICE FOR EXTRACTING KEYWORDS IN A CONVERSATION

(75) Inventors: Mitsuru Endo, Tokyo (JP); Maki Yamada, Kanagawa (JP); Keiko Morii, Kanagawa (JP); Tomohiro Konuma, Kanagawa (JP); Kazuya Nomura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 993 days.

(21) Appl. No.: 12/302,633

(22) PCT Filed: Mar. 14, 2008

(86) PCT No.: PCT/JP2008/000599
§ 371 (c)(1),
(2), (4) Date: Nov. 26, 2008

(87) PCT Pub. No.: WO2008/126355
PCT Pub. Date: Oct. 23, 2008

(65) Prior Publication Data
US 2009/0150155 A1    Jun. 11, 2009

(30) Foreign Application Priority Data
Mar. 29, 2007 (JP) ................ 2007-088321

(51) Int. Cl.
*G10L 15/28* (2006.01)
(52) U.S. Cl. ...... 704/255; 704/251; 704/275; 379/88.24
(58) Field of Classification Search ................ 704/255, 704/231, 275, 235, 251; 379/88.24
See application file for complete search history.

(56) References Cited

U.S. PATENT DOCUMENTS
6,665,644 B1    12/2003    Kanevsky et al.
(Continued)

FOREIGN PATENT DOCUMENTS
EP    1076329 A2    2/2001
JP    05-323993 A    12/1993
(Continued)

OTHER PUBLICATIONS
International Search Report, Jun. 9, 2008.
(Continued)

*Primary Examiner* — Talivaldis Ivars Smits
*Assistant Examiner* — Shaun Roberts
(74) *Attorney, Agent, or Firm* — Pearne & Gordon LLP

(57) ABSTRACT

The present invention aims at extracting a keyword of conversation without preparations by advanced anticipation of keywords of conversation. A keyword extracting device of the present invention includes an audio input section 101 by way of which a speech sound made by a speaker is input; a speech segment determination section 102 that determines a speech segment for each speaker in connection with the input speech sound; a speech recognition section 103 that recognizes a speech sound of the determined speech segment for each speaker; an interrupt detection section 104 that detects a feature of a speech response suggesting presence of a keyword on the basis of a response of another speaker to speech sounds of respective speakers; namely, an interrupt where a preceding speech and a subsequent speech overlap; a keyword extraction section 105 that extracts the keyword from the speech in the speech segment specified on the basis of an interrupt; a keyword search section 106 that performs keyword search by means of the keyword; and a display section 107 that displays a result of keyword search.

6 Claims, 13 Drawing Sheets

U.S. PATENT DOCUMENTS

| | | | |
|---|---|---|---|
| 6,714,909 B1 * | 3/2004 | Gibbon et al. | 704/246 |
| 6,850,609 B1 * | 2/2005 | Schrage | 379/202.01 |
| 7,991,128 B2 * | 8/2011 | Abernethy et al. | 379/88.24 |
| 2004/0132432 A1 * | 7/2004 | Moores et al. | 455/413 |
| 2005/0144013 A1 * | 6/2005 | Fujimoto et al. | 704/277 |
| 2008/0300872 A1 * | 12/2008 | Basu et al. | 704/235 |

FOREIGN PATENT DOCUMENTS

| | | | |
|---|---|---|---|
| JP | 08-286693 A | 11/1996 | |
| JP | 2000-122692 A | 4/2000 | |
| JP | 2002-169804 A | 6/2002 | |
| JP | 2003-208196 A | 7/2003 | |
| JP | 2004-325848 A | 11/2004 | |
| JP | 2005-215726 A | 8/2005 | |
| JP | 2005-293539 A | 10/2005 | |

OTHER PUBLICATIONS

European Search Report for Application No. 08720485.5-1224 / 2045798 dated Nov. 12, 2012.

G. Murray, et al., XP-002687104 "Incorporating Speaker and Discourse Features into Speech Summarization", Association of Computational Linguistics Proceedings of the main conference on Human Language Technology Conference of the North American Chapter of Computational Linguistics, University of Edinburgh, School of Informatics, Edinburgh EH8 9LW, Scotland, Jun. 2006, pp. 367-374.

* cited by examiner

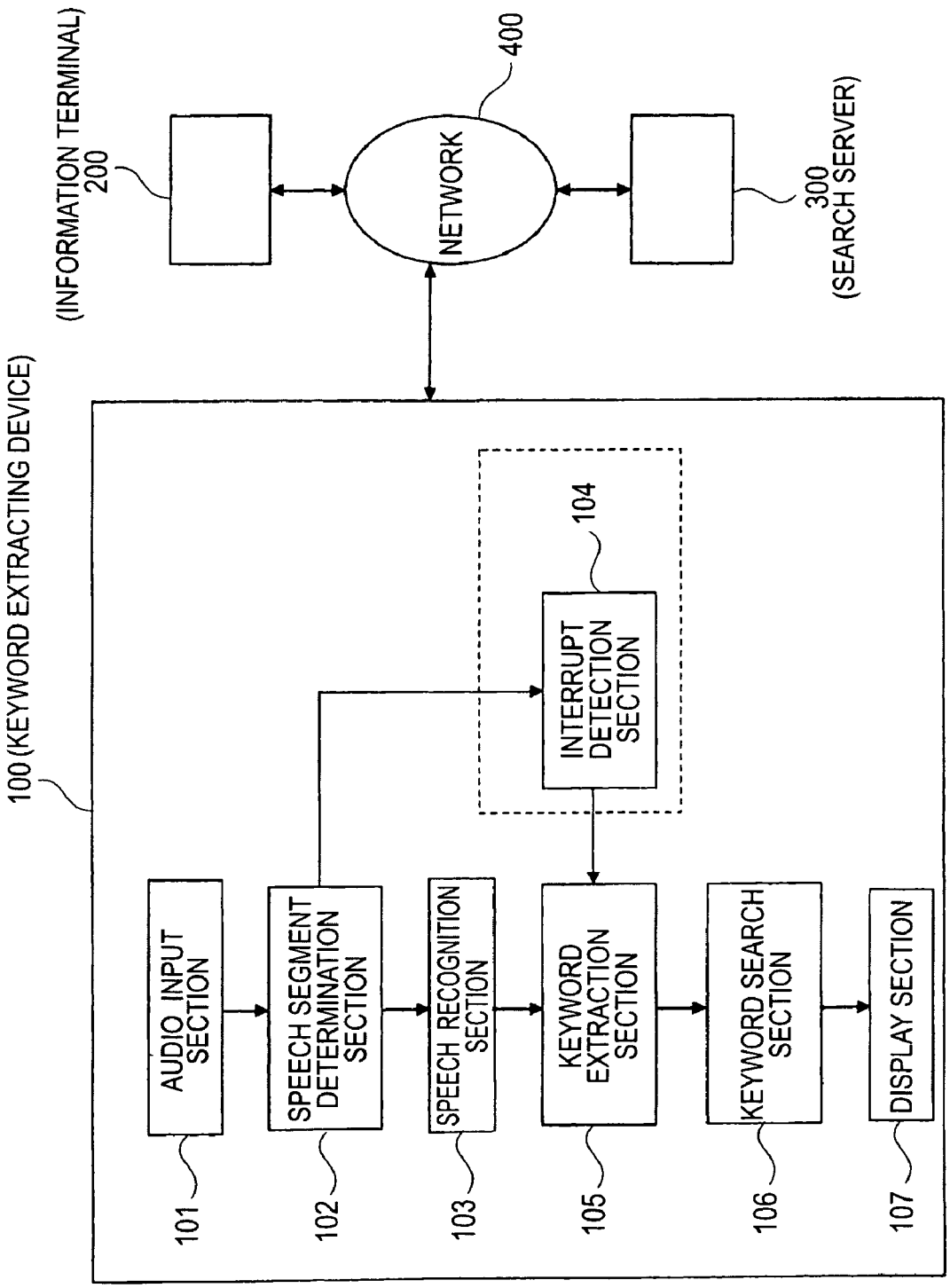

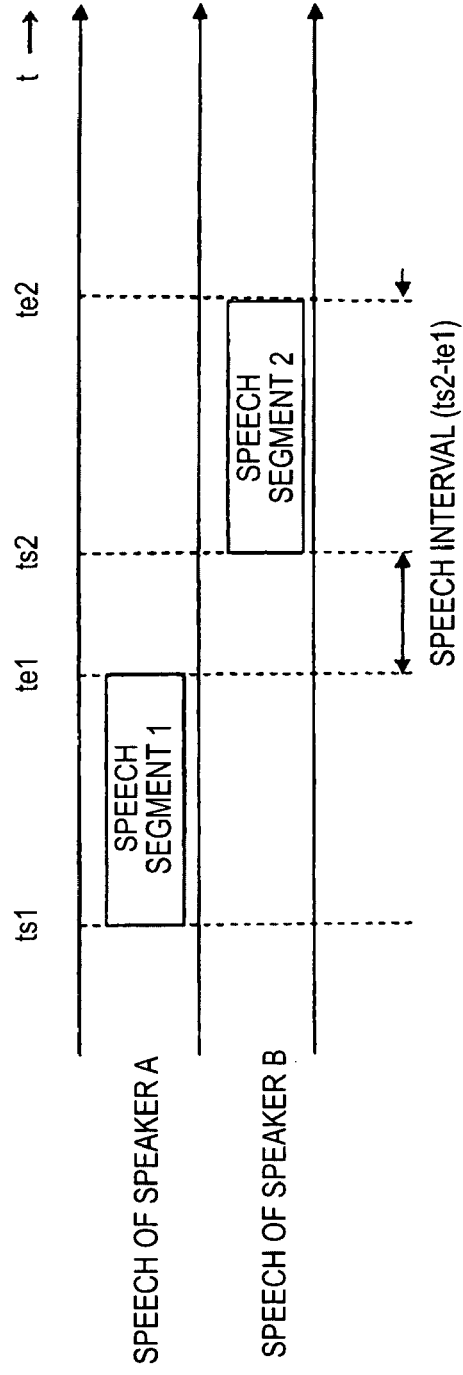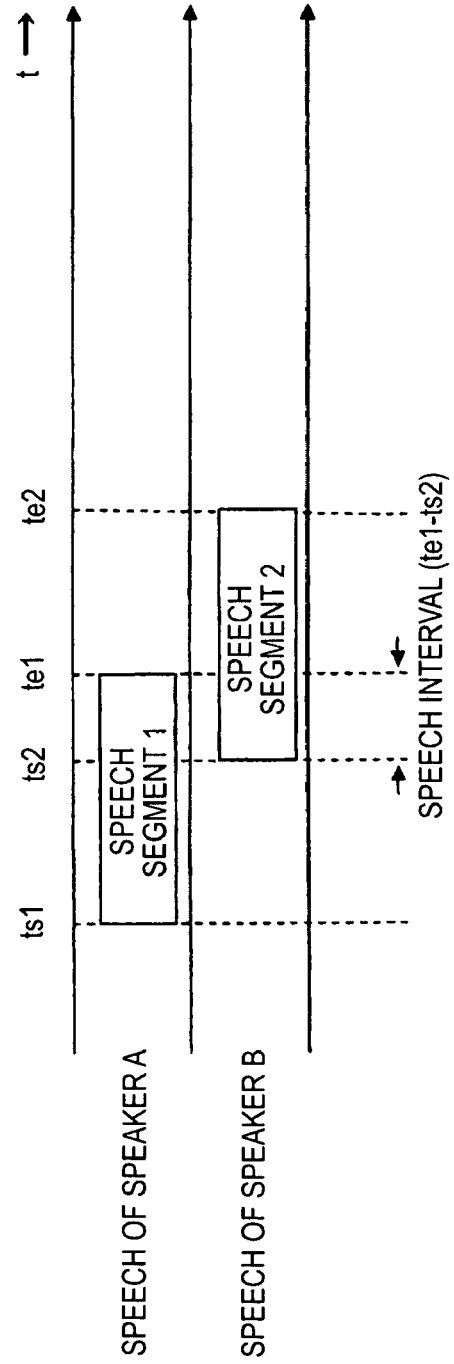

DEVICE FOR EXTRACTING KEYWORDS IN A CONVERSATION

TECHNICAL FIELD

The present invention relates to a keyword extracting device and more particularly to a keyword extracting device that extracts a keyword of conversation.

BACKGROUND ART

A related-art keyword extracting device previously retains correspondence data showing a correlation between a keyword, such as a microwave oven, and action information, such as an access to a URL. The keyword extracting device detects a keyword from a certain conversation in accordance with the correspondence data and performs processing based on action information corresponding to the keyword. Thus, information has been submitted by means of speech recognition (e.g., Patent Document 1).

Patent Document 1: JP-A-2005-215726 (see paragraphs 0021 to 0036 and FIGS. 2 and 3)

DISCLOSURE OF THE INVENTION

Problem that the Invention is to Solve

However, in the extractor described in connection with Patent Document 1, the correspondence data must be prepared for respective anticipated scenes; hence, there is a problem of difficulty being encountered in utilizing the extractor.

The present invention has been conceived to cope with the situation and aims at providing a keyword extracting device capable of extracting a keyword of conversation without advanced prediction and preparation of keywords for conversation.

Means for Solving the Problem

In order to solve the problem of the related art, the present invention includes an audio input section by way of which a speech sound made by a speaker is input; a speech segment determination section that determines a speech segment for each speaker in connection with the input speech sound; a speech recognition section that recognizes a speech sound of the determined speech segment for each speaker; a speech response feature extraction section that extracts a feature of a response suggesting presence of a keyword in accordance with a response of another speaker to the speech sound of the speaker; and a keyword extraction section that extracts the keyword from the speech sound in the speech segment specified on the basis of the feature of the extracted speech response.

Advantage of the Invention

According to the present invention, a keyword of conversation can be extracted without advanced, anticipated preparation of keywords for conversation.

BRIEF DESCRIPTION OF THE DRAWINGS

[FIG. 1] A block diagram showing an example configuration of an overall system including a keyword extracting device of a first embodiment of the present invention.

[FIGS. 2A and 2B] Views showing examples of speech segments of the first embodiment of the present invention.

DESCRIPTIONS OF THE REFERENCE NUMERALS

Figure 3:
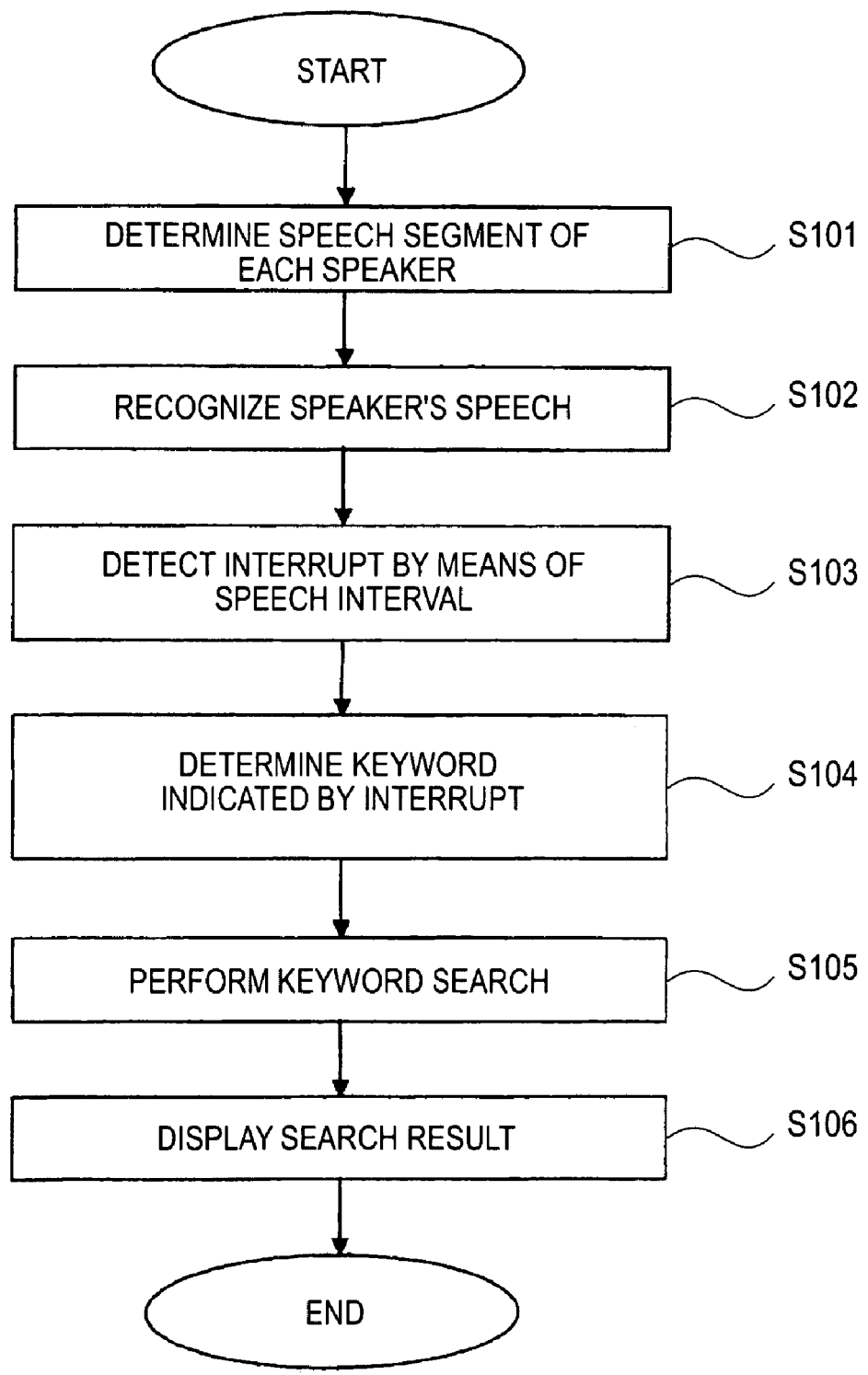
[FIG. 3] A flowchart showing operation of the keyword extracting device shown in FIG. 1.

100, 100A, 100B, 100C, 100D KEYWORD EXTRACTING DEVICES
101 AUDIO INPUT SECTION
102 SPEECH SEGMENT DETERMINATION SECTION
103 SPEECH RECOGNITION SECTION
104 INTERRUPT DETECTION SECTION
105, 105A, 105B, 105C, 105D KEYWORD EXTRACTION SECTIONS
106 KEYWORD SEARCH SECTION
107 DISPLAY SECTION
201 PITCH DETERMINATION SECTION
202 PITCH PATTERN DETERMINATION SECTION
301 FUNCTIONAL PHRASE EXTRACTION SECTION
302 FUNCTIONAL PHRASE STORAGE SECTION
401 VIDEO INPUT SECTION
402 FACIAL EXPRESSION RECOGNITION SECTION
501 EXCITING REACTION DETECTION SECTION

BEST MODES FOR IMPLEMENTING THE INVENTION

First through fifth embodiments of the present invention will be described below by reference to the drawings. The first through fifth embodiments will be described on the basis of a presumed scene of; for instance, two speakers A and B, carrying on a conversation by use of information terminals, such as portable cellular phones.

First Embodiment

FIG. 1 is a block diagram showing an example configuration of an overall system including a keyword extracting device of a first embodiment of the present invention.

In FIG. 1, a keyword extracting device 100 is an information terminal of a certain speaker A and configured so as to enable establishment of a connection with a network 400, such as the Internet. The network 400 is configured in such a way that an information terminal 200 of another speaker B and a search server 300 are connected to the network. The keyword extracting device 100 and the information terminal 200 are information terminals, such as a portable cellular phone, a notebook computer, and a portable information terminal. The search server 300 is a server equipped with a known search engine. The keyword extracting device 100 has an audio input section 101, a speech segment determination section 102, a speech recognition section 103, an interrupt detection section 104, a keyword extraction section 105, a keyword search section 106, and a display section 107.

The audio input section 101 is for inputting voice (hereinafter called a "speech sound") of a speaker. The audio input section 101 corresponds to a communications interface with; for instance, a microphone, a network 400, and the like.

The speech segment determination section 102 determines a speech segment for each speaker in connection with the input speech sound. The speech segment refers to a segment from when the speaker starts an utterance until when the speaker ends the utterance.

For instance, a conversation made between the speaker A and the speaker B is such as that shown in FIG. 2A or 2B, the speech segment determination section 102 determines a segment from a start time ts1 to an end time te1 of an utterance of the speaker A; namely, ts1-te1, as a speech segment 1 of the speaker A. Further, the speech segment determination section 102 determines a segment from a start time ts2 to an end time te2 of an utterance of the speaker B; namely, ts2-te2, as a speech segment 2 of the speaker B.

Turning back to FIG. 1, the speech recognition section 103 recognizes a speech sound in the thus-determined speech segment for each speaker. Specifically, the speech recognition section 103 converts conversational speech of all speakers into texts by means of a known speech recognition technique. Further, the speech recognition section 103 brings a start time (a start point) and an end time (an end point) into correspondence with an utterance of an individual speaker.

The interrupt detection section 104 (a speech response feature extraction section) detects a feature of a speech; namely, an interrupt where a preceding speech and a subsequent speech overlap each other, on the basis of speech sounds of respective speakers in connection with the determined speech segment. For instance, when a conversation made between the speaker A and the speaker B is a conversation shown in FIG. 2B, the interrupt detection section 104 detects an interrupt, because a subsequent speech of the speaker B is commenced in the middle of a preceding speech of the speaker A; namely, at ts1. A detection method is as follows.

Specifically, the interrupt detection section 104 first measures a segment from a start time of a subsequent speech until an end time of a speech immediately preceding the subsequent speech (hereinafter called a "speech interval"). For instance, in the case of FIGS. 2A,2B, the interrupt detection section 104 computes a speech interval by use of a computing equation of ts2-te1 in FIGS. 2A,2B=a speech interval. Next, the interrupt detection section 104 determines whether or not a speech interval assumes a negative value (see FIG. 2B) as a result of computation. When the speech interval assumes a negative value (see FIG. 2B), which is a overlap, the interrupt detection section 104 performs detection by considering that there is an interrupt.

The keyword extraction section 105 extracts, from the speech sound recognized by the speech recognition section 102, a word (hereinafter called a "keyword") that is the topic of conversation of the speech sound on the basis of the extracted feature of the speech; namely, an interrupt where a preceding speech and a subsequent speech overlap each other. Specifically, the keyword extraction section 105 acquires, from the speech recognition section 102, an utterance recognized by the speech recognition section 102. The utterance is brought into correspondence with the start time and the end time of each of the speakers. Further, the keyword extraction section 105 acquires, from the interrupt detection section 104, a speech segment where the interrupt detection section 104 has detected an interrupt (e.g., the speech segment 2 of the speaker B shown in FIG. 2B) and an interrupted speech segment (e.g., the speech segment 1 of the speaker A shown in FIG. 2B). The speech segments are brought into correspondence with each other by means of the start time and the end time.

When extracting the keyword, the keyword extraction section 105 extracts; for instance, a constituent element (e.g., a noun) at the end (the last) of an interrupted preceding speech as a keyword. The end of the preceding speech means the inside of a speech segment (e.g., ts1-ts2 in FIG. 2B) before an interrupt (e.g., the time ts2 in FIG. 2B).

Specifically, the keyword extraction section 105 first selects a speech segment (e.g., the speech segment 1 in FIG. 2B) that started earlier from the acquired speech segments (e.g., the speech segments 1, 2 shown in FIG. 2B) of the respective speakers. Next, the keyword extraction section 105 detects a constituent element (e.g., a noun) of the selected speech segment (e.g., the speech segment 1 in FIG. 2B) located immediately before a start time (i.e., an interrupt time; for instance, ts2 in FIG. 2B) of the acquired another speech segment. The keyword extraction section 105 extracts the thus-detected constituent element (e.g., a noun) as a keyword.

The keyword search section 106 conducts a search for a keyword by use of the extracted keyword. Specifically, the keyword search section 106 first makes a connection to the search server 300 by way of the network 400. Upon receipt of a request for searching the keyword from the keyword search section 106, the search server 300 returns a result of search of the keyword to the keyword search section 106 of the keyword extracting device 100 by way of the network 400. By means of the return, the keyword search section 106 receives the result of search of the keyword from the search server 300.

The display section 107 displays a result of search performed by the keyword search section 106; namely, a result of search performed by the search server 300. The display section 107 is a display device, such as a display and a display panel.

In the present embodiment, the speech segment determination section 102, the speech recognition section 103, the interrupt detection section 104, the keyword extraction section 105, and the keyword search section 106 correspond to a processor, such as a CPU. In other respects, the keyword extracting device 100 is assumed to have a known configuration including a storage device (not shown), such as memory.

Operation of the keyword extracting device 100 will now be described by reference to FIG. 3. In FIG. 3, an explanation is provided on the assumption that the two speakers A, B are carrying on a conversation by use of the keyword extracting device 100 and the information terminal 200.

First, the keyword extracting device 100 (the speech segment determination section 102) determines a speech segment for each speaker in connection with speech sounds input from the Audio input section 101 and the information terminal 200 (step S101). At the time of the determination, the speech segment determination section 102 determines whether or not a volume level of the speech sound of each speaker is greater than a threshold value and evaluates, as a speech segment, a segment where a sound level is greater than the threshold value.

For instance, when a conversation between the speaker A and the speaker B is such as that shown in FIG. 2A or 2B, the speech segment determination section 102 determines a segment from a start time ts1 to an end time te1 of the utterance of the speaker A; namely, ts1-te2, as the speech segment 1 of the speaker A. Further, the speech segment determination section 103 determines a segment of the utterance of the speaker B from a start time ts2 to an end time te2; namely, ts2-te2, as the speech segment 2 of the speaker B.

Next, the keyword extracting device 100 (the speech recognition section 103) recognizes a speech sound of the determined speech segment for each speaker (step S102). Recognition is assumed to be carried out by means of analysis of; for instance, a feature on the basis of a frequency band. Further, when performing recognition, the speech recognition section 103 converts speech sounds of all speakers into texts by means of a known speech recognition technique.

The keyword extracting device 100 (the interrupt detection section 104) detects an interrupt from the determined speech segment (step S103). Specifically, the interrupt detection section 104 computes an interval determined by subtracting an end time of an immediately-preceding speech from a start time of a subsequent speech; namely, a speech interval (e.g., te1-ts2 in FIGS. 2A and 2B). When a result of computation shows that a value of the speech interval (e.g., a speech interval=te1-ts2 in FIG. 2B) is negative, which is a overlap, the interrupt detection section 104 determines that an interrupt has occurred in the subsequent speech.

Next, the keyword extracting device 100 (the keyword extraction section 105) extracts and determines a keyword in the detected conversational speech (a conversational speech recognized in step S102) in which the interrupt has occurred (step S104). Specifically, the keyword extraction section 105 extracts a noun in the speech immediately preceding the subsequent speech and determines the noun as a keyword in the speech.

For example, when the speaker A started an utterance "Tokyo Sky Tree will be . . . " at time ts1 in FIG. 2B and when the speaker B started a responsive utterance "Where will it be constructed?" at time ts2 in FIG. 2B, the keyword extractions section 105 determines a noun "Tokyo Sky Tree", which consists of a phrase but is frequently treated as one word entry in the lexicon for speech recognition, uttered by the speaker A immediately before ts2 as a keyword. The keyword extraction section 105 can determine the word "Tokyo Sky Tree" as a word that is the topic of conversation without extracting a keyword "Tokyo Sky Tree" from a database where previously-anticipated keywords are registered.

When the speech interval shows a positive value (see FIG. 2A), the keyword extraction section 105 determines that a keyword is not included in the utterance and does not extract any keyword.

The keyword extracting device 100 (the keyword search section 106) performs a search for the thus-determined keyword (step S105). Specifically, the keyword search section 106 requests the search server 300 to search the keyword by way of the network 400. The search server 300 performs the requested search for the keyword and transmits a result of search to the keyword search section 106. The keyword search section 106 receives the search result transmitted from the search server 300.

The keyword search section 106 displays the received search result on the display section 107 (step S106). As a result, it becomes possible for the speaker to grasp information (a search result) pertaining to a keyword (e.g., Tokyo Sky Tree) in the utterance.

Activating, in place of the interrupt detection section 104, a silence detection section that detects silence of a threshold value (e.g., three seconds) or greater previously set by the speech interval is also useful for extracting a feature of a speech response suggesting presence of a keyword.

As mentioned above, according to the present embodiment, the keyword extracting device 100 detects an interrupt, which is a feature of a speech response suggesting presence of a keyword, and extracts a keyword of conversation. Therefore, the keyword extracting device 100 can extract a keyword of conversation on the basis of occurrence or nonoccurrence of a speaker's interrupt without advanced anticipation of a keyword of conversation and registering the anticipated keyword in a database, and the like.

The first embodiment has described the case where the keyword extracting device 100 sequentially performs processing pertaining to steps S101 to S106 in FIG. 3, but processing is not limited to the sequence. For instance, the keyword extracting device 100 may perform processing pertaining to the steps shown in FIG. 3 by means of changing the sequence shown in FIG. 3 or perform processing pertaining to the respective steps in parallel.

Second Embodiment

A keyword extracting device of a second embodiment extracts a keyword of conversation on the basis of a pattern of a pitch (the degree of height of a tone) that is a feature of a speech response.

Figure 4:
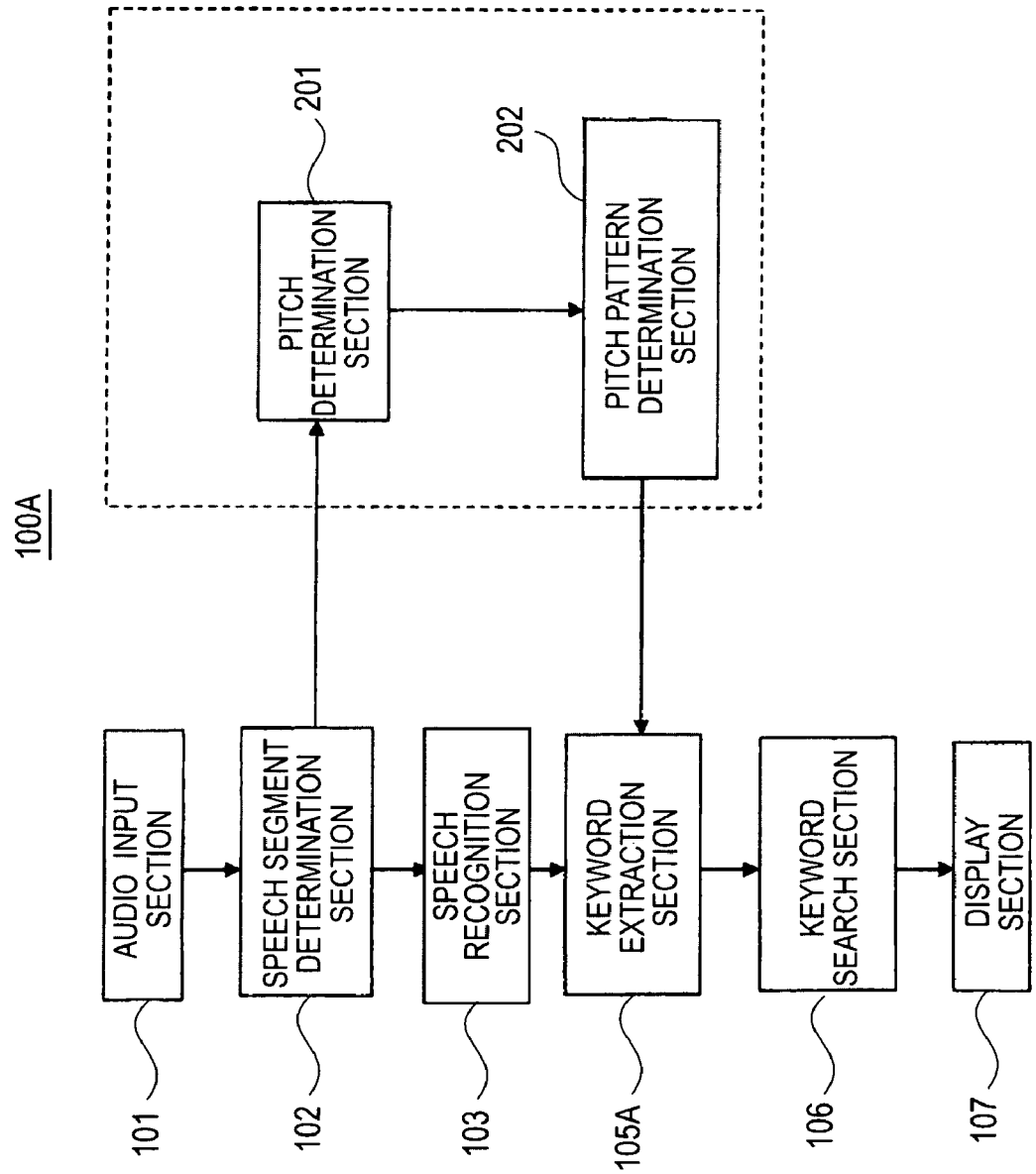
[FIG. 4] A block diagram showing an example configuration of a keyword extracting device of a second embodiment of the present invention.

FIG. 4 is a block diagram showing an example configuration of a keyword extracting device of the second embodiment of the present invention. In the second embodiment, elements which are the same as those of the first embodiment are assigned the same reference numerals and terms that are identical with those used in the first embodiment, and their repeated explanations are omitted.

In FIG. 4, a keyword extracting device 100A has a pitch determination section 201 and a pitch pattern determination section 202 in lieu of the interrupt detection section 104 of the first embodiment shown in FIG. 1. Further, the keyword extracting device 1004A is different from its counterpart of the first embodiment in having a keyword extraction section 105A in lieu of the keyword extraction section 105 of the first embodiment shown in FIG. 1. The pitch determination section 201, the pitch pattern determination section 202, and the keyword extraction section 105A correspond to a processor, such as a CPU. In other respects, the configuration of an overall system including the information terminal 200 is analogous to that of the system shown in FIG. 1.

In connection with the speech segment determined by the speech segment determination section 102, the pitch determination section 201 and the pitch pattern determination section 202 (both of which are also called a "speech response feature extraction section") extract a pitch pattern, which is a feature of a speech, on the basis of speech sounds of respective speakers. Specifically, the pitch determination section 201 determines a pitch of the speech sound. The pitch determination section 201 of the present embodiment divides a speech sound at; for instance, every 10 ms, thereby determining a pitch.

Figure 5:
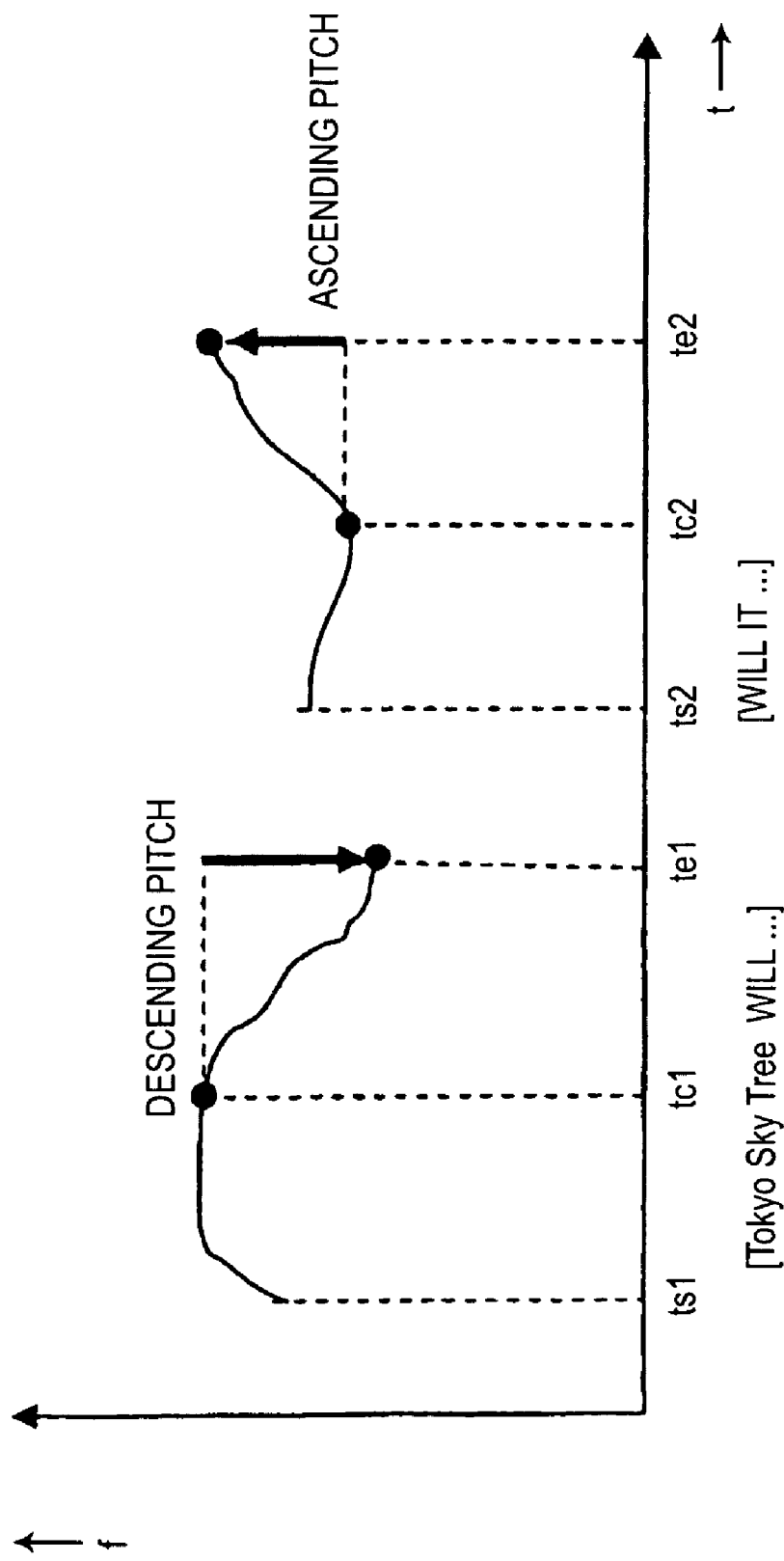
[FIG. 5] A view showing an example pitch pattern of the second embodiment of the present invention.

On the basis of the thus-determined pitch, the pitch pattern determination section 202 determines a pitch pattern (a feature of a speech response) including a descending pitch (see the segment tc1-te1 in FIG. 5) at the end of a preceding speech and an ascending pitch (see the segment tc2-te2 in FIG. 5) of a speech immediately following the preceding speech. FIG. 5 shows an example determination. In FIG. 5, a horizontal axis represents a time, and a vertical axis represents a frequency.

A preceding speech "Tokyo Sky Tree will be" is present in the speech segment ts1-te1 in FIG. 5, and a subsequent speech "Will it be . . . ?" is present in the speech segment ts2-te2. A descending pitch is determined to be present at the end of the preceding speech "Tokyo Sky Tree will be," and an ascending pitch is determined to be present in the subsequent speech "Will it be . . . ?" The reason why such a determination is made is that the pitch pattern determination section 202 has made a determination as follows.

Specifically, the pitch pattern determination section 202 determines the ascending pitch, because a frequency "f" of the last of the speech segment (an end time) is higher than a frequency "f" of a middle point tc1 in the speech segment ts1-te1 of "Tokyo Sky Tree will" in FIG. 5. The pitch pattern determination section 202 determines the descending pitch, because the frequency "f" of the last of the speech segment (the end time) is lower than the frequency "f" of a middle point tc2 in the speech segment ts2-te2 of the "Will it be . . . " in FIG. 5.

An explanation is given to the case where the pitch pattern determination section 202 of the present embodiment determines an ascending pitch or a descending pitch with reference to a frequency of a middle point of the speech segment, but the pitch pattern determination section is not limited to the case. For instance, the pitch determination section 201 may also make a determination with reference to a point in time that goes back from an end time (e.g., te1 or te2 in FIG. 5) of a speech segment by a predetermined segment (e.g., a time T).

The keyword extraction section 105A extracts a keyword from the preceding speech indicated by the determined pitch pattern. At the time of extraction operation, the keyword extraction section 105A extracts, as a keyword, a constituent element (e.g., a noun) at the end of a preceding speech indicated by the pitch pattern.

Figure 6:
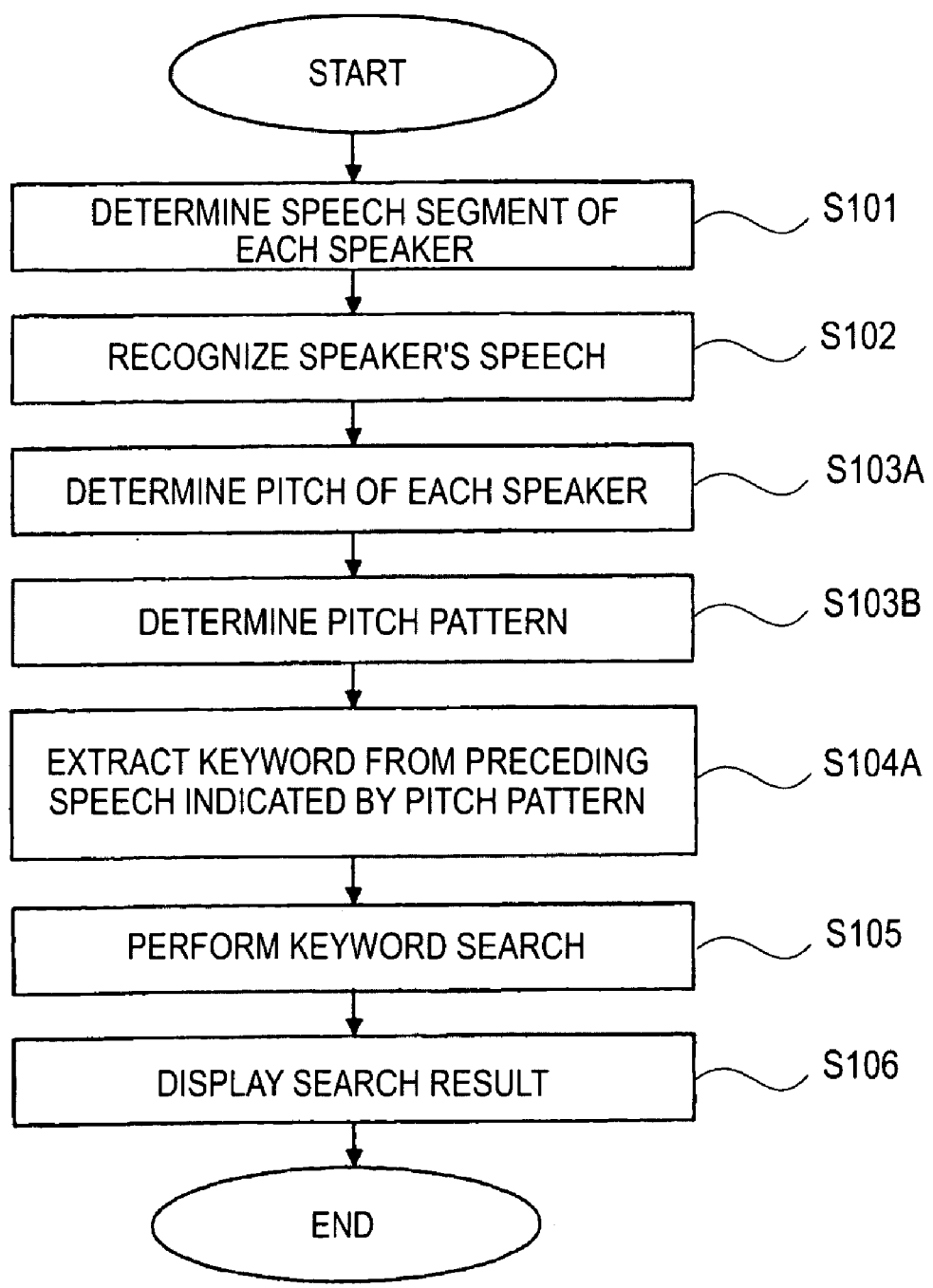
[FIG. 6] A flowchart showing operation of the keyword extracting device shown in FIG. 4.
Figure 7:
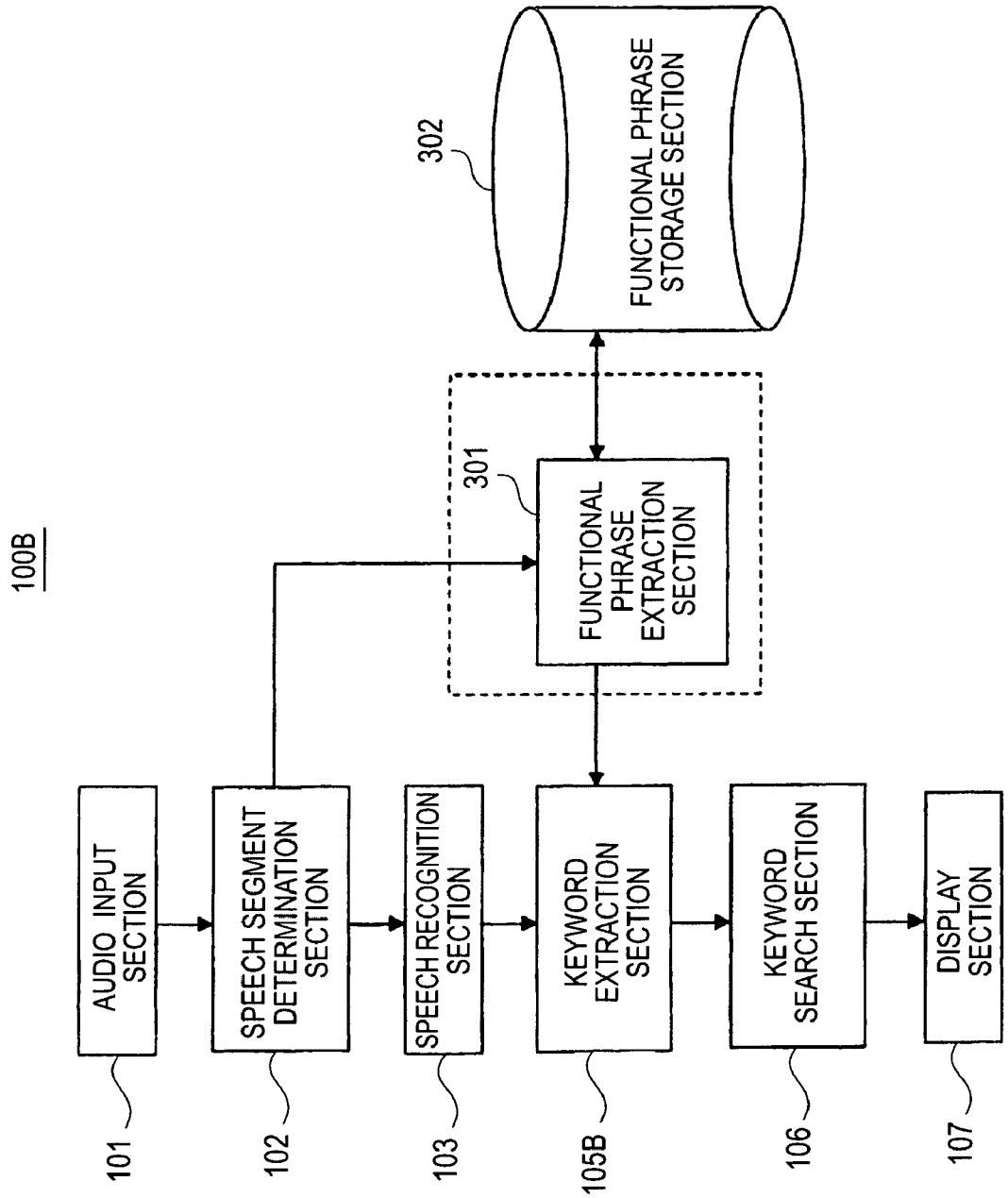
[FIG. 7] A block diagram showing an example configuration of a keyword extracting device of a third embodiment of the present invention.

Operation of the keyword extracting device 100A will now be described by reference to FIG. 6. In FIG. 6, an explanation is provided; for instance, on the assumption that the speaker B will say "Will it be . . . ?" by use of the information terminal 200 after the speaker A has told "Tokyo Sky Tree will be . . . in future" by use of the keyword extracting device 100A. Processing pertaining to steps S101 to S102 and S105 to S106 in FIG. 7 is analogous to processing pertaining to steps S101 to S102 and S105 to S106 in FIG. 3, and hence their explanations are discretionarily omitted.

First, the keyword extracting device 100A (the speech segment determination section 102) determines a speech segment (see the speech segment 1 in FIG. 2A and the speech segment 2 in FIG. 2B) for each speaker in connection with speech sounds input from the speech input section 100 and the information terminal 200 (step S101). Next, the keyword extracting device 100A (the speech recognition section 103) recognizes speech sound of the determined speech segment for each speaker (step S102).

The keyword extracting device 100A (the pitch determination section 201) determines a pitch of the speech sound on the basis of; for instance, speech sound of the speech segment 1 (see FIG. 2A) of the preceding speech of the speaker A and speech sound of the speech segment 2 (see FIG. 2B) of the subsequent speech of the speaker B (step S103A).

When a shift has occurred from the preceding speech to the subsequent speech, the keyword extracting device 100A (the pitch pattern determination section 202) determines, on the basis of the thus-determined pitch, whether or not there is a pitch pattern that changes from a descending pitch to an ascending pitch (step S103B). Specifically, the pitch pattern determination section 202 determines a pitch pattern including a descending pitch (see a segment tc1-te1 in FIG. 5) at the end of the preceding speech and an ascending pitch (see the segment tc2-te2 in FIG. 5) in the speech immediately subsequent to the preceding speech.

The keyword extracting device 100A (the keyword extraction section 105A) extracts a keyword from the preceding speech (e.g., "Tokyo Sky Tree will" in FIG. 5) of the speech sound (recognized in step S102) indicated by the thus-determined pitch pattern (step S104A). At the time of extraction operation, the keyword extraction section 105A extracts; for instance, "Tokyo Sky Tree" that is a noun at the end of the preceding speech indicated by the pitch pattern, as a keyword.

The keyword extracting device 100A (the keyword search section 106) causes the search server 300 to search the thus-determined keyword by way of the network 400 (step S105). The keyword search section 106 displays a received search result on the display section 107 (step S106). As a result, the speaker can grasp information (a search result) pertaining to a word that is the topic (e.g., "Tokyo Sky Tree").

As mentioned above, in the present embodiment, the keyword extracting device 100A determines a pitch pattern, which is a feature of a speech response suggesting presence of a keyword, thereby extracting a keyword of conversation. Therefore, the keyword extracting device 100A can extract a keyword of conversation on the basis of presence or absence of a pitch pattern without preparations; namely, advanced anticipation of a keyword, which will be used in conversation, and registration of the anticipated keyword in a database, and the like.

The second embodiment has described the case where the keyword extracting device 100A sequentially performs processing pertaining to steps S101 to S102, S103A to S103B, S104A, and S105 to S106 in FIG. 7; however, processing is not limited to the sequence. For instance, the keyword extracting device 100A may also perform processing by means of changing the sequence of processing pertaining to the respective steps shown in FIG. 7 or perform processing pertaining to the respective steps in parallel.

Third Embodiment

A keyword extracting device of a third embodiment extracts a keyword of conversation on the basis of a functional phrase that is a feature of a speech response.

FIG. 7 is a block diagram showing an example configuration of the keyword extracting device of the third embodiment of the present invention. In the third embodiment, elements which are the same as those of the first embodiment are assigned the same reference numerals and terms as those used in the first embodiment, and their repeated explanations are omitted.

In FIG. 7, a keyword extracting device 100B has a functional phrase extraction section 301 (a speech response feature extraction section) in lieu of the interrupt detection section 104 of the first embodiment shown in FIG. 1. The keyword extracting device 100B further has a functional phrase storage section 302. The keyword extracting device 100B differs from its counterpart of the first embodiment in having a keyword extraction section 105B in place of the keyword extraction section 105 of the first embodiment shown in FIG. 1. The functional phrase extraction section 301 is a processor such as a CPU, and the functional phrase storage section 302 is a storage device, such as memory. In other respects, the configuration of an overall system including the information terminal 200 is analogous to that of the system shown in FIG. 1.

The functional phrase storage section 302 stores a previously-defined functional phrase. The functional phrase is a word showing the type of a response and used commonly in conversations regardless of contents of various different conversations. For instance, the functional phrase corresponds to an interrogative sentence, such as "Is it . . . ?"; a sentence of agreement, such as "Good," "I see," and "That's it"; a negative sentence, such as "No"; a sentence of a request, such as "Please"; an exclamatory sentence, such as "Well"; and a feeding sentence, such as "Why?"; and the like.

The functional phrase extraction section 301 extracts the functional phrase, which is the feature of the speech sound, from the speech sound. Specifically, the functional phrase extraction section 301 compares the line of words included in the speech sound, which is to become a target of extraction, with functional phrases in the functional phrase storage section 302, thereby extracting the functional phrase included in the speech sound.

Figure 8:
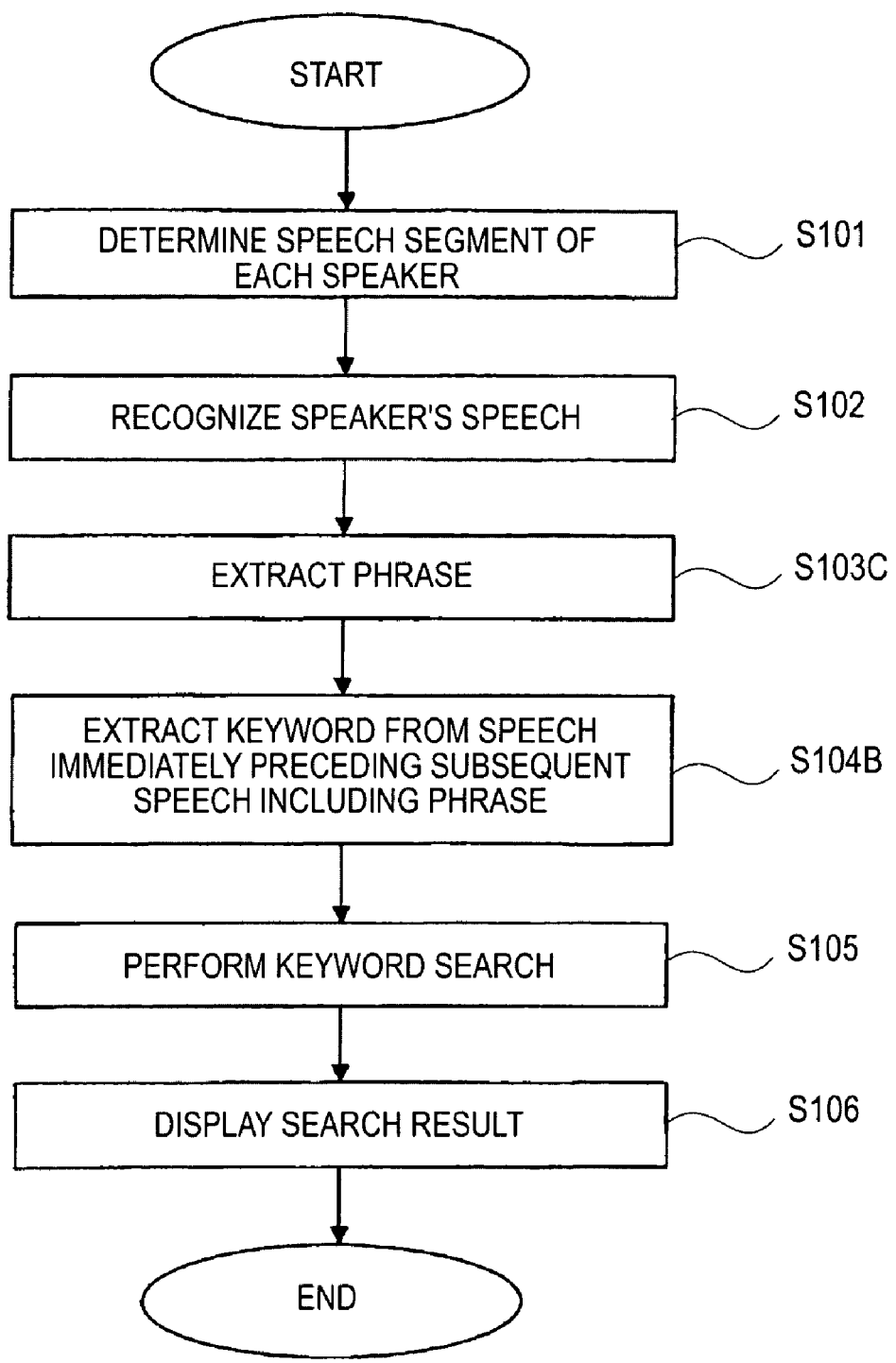
[FIG. 8] A flowchart showing operation of the keyword extracting device shown in FIG. 7.

Next, operation of the keyword extracting device 100B will be described by reference to FIG. 8. In FIG. 8, an explanation is provided; for instance, on the assumption that the speaker B will say "Where will it be constructed?" by use of the information terminal 200 after the speaker A has told "Tokyo Sky Tree will be constructed in future" by use of the keyword extracting device 10B. Processing pertaining to steps S101 to S102 and S105 to S106 in FIG. 8 is analogous to processing pertaining to steps S101 to S102 and S105 to S106 in FIG. 3, and hence their explanations are discretionarily omitted.

First, the keyword extracting device 100B (the speech segment determination section 102) determines a speech segment (see the speech segment 1 in FIG. 2A and the speech segment 2 in FIG. 2B) for each speaker in connection with speech sounds input from the speech input section 100 and the information terminal 200 (step S101). Next, the keyword extracting device 100B (the speech recognition section 103) recognizes speech sound of the determined speech segment for each speaker (step S102).

The keyword extracting device 100B (the functional phrase extraction section 301) extracts a functional phrase expressing an interrogative sentence, and the like, from; for instance, the speech sound of the speech segment 1 (see FIG. 2A) of the preceding speech of the speaker A and the speech sound of the speech segment 2 (see FIG. 2B) of the subsequence speech of the speaker B. Specifically, the functional phrase extraction section 301 compares the line of words included in the speech sound, which is to become a target of extraction, with functional phrases in the functional phrase storage section 302, thereby extracting a functional phrase included in the speech sound. In the present embodiment, the functional phrase extraction section 301 extracts a functional phrase of an interrogative sentence "where" from speech sound of "Oh, where will it be constructed?". A result of recognition of the sound may also be utilized as the line of a word included in the speech sound.

Next, the keyword extracting device 100B (the keyword extraction section 105B) extracts a keyword from among the speech sound (recognized in step S102) immediately preceding the speech including the extracted functional phrase (step S104B). At the time of extraction of the keyword, the keyword extraction section 105B extracts "Tokyo Sky Tree" that is a noun (achieved immediately before occurrence of an interrupt) at the end of the immediately-preceding speech as a keyword from the immediately-preceding speech "I heard that Tokyo Sky Tree will be constructed in future."

Next, the keyword extracting device 100B (the keyword search section 106) causes the search server 300 to perform a search for the thus-extracted keyword by way of the network 400 (step S105). Subsequently, the keyword search section 106 displays the received search result on the display section 107 (step S106). As a result, it becomes possible for the speaker to grasp information (a search result) pertaining to the keyword (e.g., Tokyo Sky Tree) that is the topic of conversation.

Moreover, in the present embodiment, when a functional phrase ("What's that?") of an interrogative sentence is extracted from a preceding speech as in the case where the speaker A makes a question "What's that?" and where the speaker B makes an answer "You mean Tokyo Sky Tree?", the keyword extraction section 105B can also be activated so as to extract a keyword ("Tokyo Sky Tree") from an immediately-subsequent speech. At that time, switching can be made as follow between extraction of a keyword from an immediately-preceding speech sound and extraction of a keyword from an immediately-subsequent speech sound. Specifically, switching can be made such that a keyword is extracted from an immediately-preceding speech when a demonstrative pronoun "it" is included; that a keyword is extracted from an immediately-subsequent speech when a demonstrative pronoun "that" is included; and that a keyword is extracted from an immediately-subsequent speech in other cases. At that time, a feature of a speech response may also be grasped by utilization (combined use) of a pitch pattern including an ascending pitch in a preceding speech and a descending pitch in a subsequent speech under a method analogous to that described in connection with the second embodiment.

As mentioned above, according to the present embodiment, the keyword extracting device 100B extracts a functional phrase (an interrogative sentence, and the like) commonly used irrespective of contents of conversation (a genre), thereby extracting a keyword of conversation. Therefore, the keyword extracting device 100B can extract, from conversation, a commonly-used functional phrase, thereby extracting a keyword. Therefore, the keyword extracting device 100B can extract a keyword without preparations; namely, advanced anticipation of keywords responsive to conversation of respective genres and registration of the anticipated keywords in a database, and the like; hence, the extractor is useful.

The third embodiment has described the case where the keyword extracting device 100B sequentially performs processing pertaining to steps S101 to S102, S103C, S104B, and S105 to S106 in FIG. 8; however, processing is not limited to the sequence. For instance, the keyword extracting device 100B may also perform processing by means of changing the sequence of processing pertaining to the respective steps shown in FIG. 9 or perform processing pertaining to the respective steps in parallel.

Fourth Embodiment

A keyword extracting device of a fourth embodiment extracts a keyword of conversation on the basis of a change in the facial expression of a person who heard the speech sound.

Figure 9:
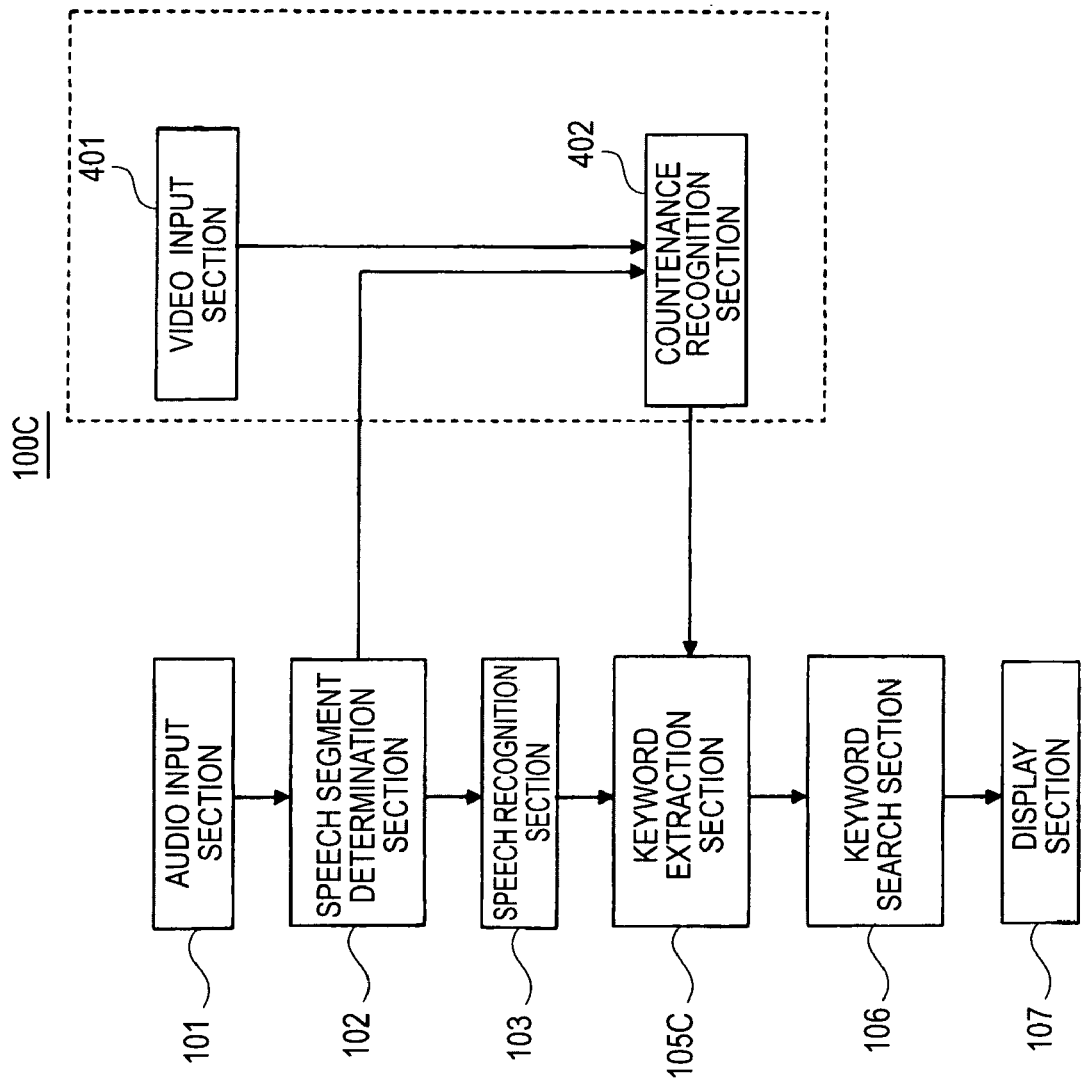
[FIG. 9] A block diagram showing an example configuration of a keyword extracting device of a fourth embodiment of the present invention.

FIG. 9 is a block diagram showing an example configuration of a keyword extracting device of the fourth embodiment of the present invention. In the fourth embodiment, elements which are the same as those of the first embodiment are assigned the same reference numerals and terms that are identical with those used in the first embodiment, and their repeated explanations are omitted.

In FIG. 9, a keyword extracting device 100C has a video input section 401 and a facial expression recognition section 402 (both of which will also be called in combination a "speech response feature extraction section") in lieu of the interrupt detection section 104 of the first embodiment shown in FIG. 1. Further, the keyword extracting device 100C is different from its counterpart of the first embodiment in having a keyword extraction section 105C in lieu of the keyword extraction section 105 of the first embodiment shown in FIG. 1. The video input section 401 is a camera, and the facial expression recognition section 402 is a processor, such as a CPU. In other respects, the configuration of an overall system including the information terminal 200 is analogous to that of the system shown in FIG. 1.

The video input section 401 is for inputting image data including a user's face. The facial expression recognition section 402 converts the image data into original image data of digital data that enable performance of processing for estimating a user's facial expression; extracts a user's face region included in the original image data; and extracts the position of a contour of at least one or more face organs constituting the user's face, such as eyes and a mouth, from the extracted face region. The facial expression recognition section 402 extracts the contours of upper and lower ends of the face organ acquired over a plurality of video frames and recognizes the user's facial expression (e.g., neutrality, surprise, joy, anger, and the like) from the degree of opening or the degree of curve of the contour of the face organ.

At that time, the facial expression recognition section 402 connects a time in a speech segment acquired from the speech segment determination section 102 for each speaker with a result of recognition of a person's facial expression other than the speakers. Further, the facial expression recognition section 402 extracts points of changes in the facial expression from the result of recognition of the facial expression.

Figure 10:
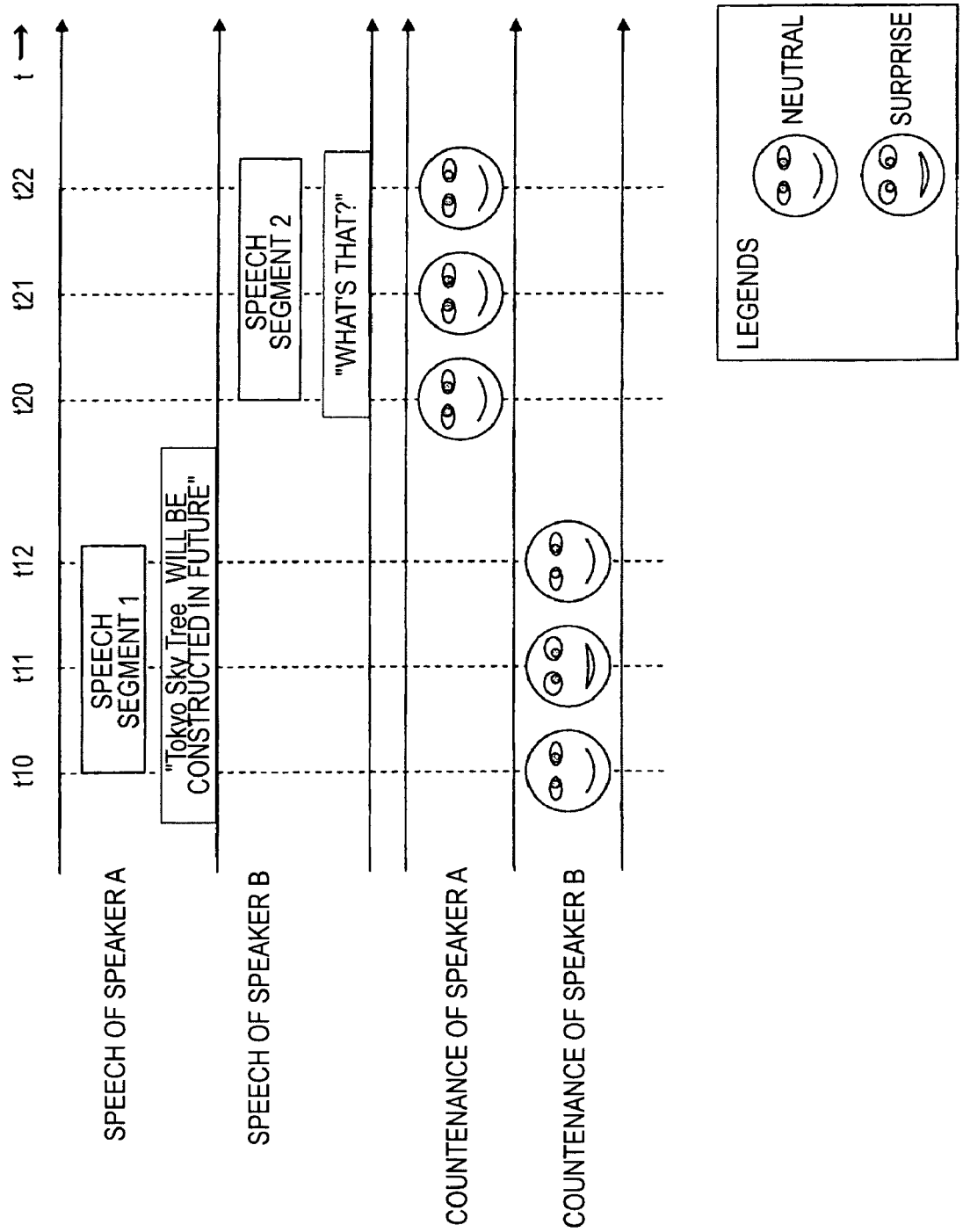
[FIG. 10] A view showing an example speech segment, an example speech content, and an example result of facial expression recognition of the fourth embodiment of the present invention.

In FIG. 10, t10 is a speech start time of the speaker A in the speech segment 1; t11 and t12 are evenly-spaced times subsequent to t10; t20 is a speech start time of the speaker B in the speech segment 2; and t21 and t22 are evenly-spaced times subsequent to t20. The facial expression recognition section 402 recognizes, in a linked manner, facial expressions of the speaker B acquired at times t10, t11, and t12 and facial expressions of the speaker A acquired at times t20, t21, and t22. In the present embodiment, the facial expression of the speaker B achieved at time t11 is a surprised facial expression, and neutral facial expressions are acquired at other times regardless of the speakers. Specifically, the facial expression recognition section 402 extracts time t11 as a point of change in facial expression.

When the facial expression recognition section 402 recognized that the recognized facial expression was a neural facial expression at commencement of a speech and that the facial expression changed to another facial expression in the middle of speech, the keyword extraction section 105C extracts a word uttered at a time corresponding to the point of change in facial expression as a keyword. At that time, the keyword extraction section 105C may also seek a word acquired at a time corresponding to a facial expression from segment information for each word in speech recognition results or may estimate a word from the number of syllables included in speech sound. A corresponding time referred to herein is a time when the end of the action for speaking a word and the facial expression are associated with each other, in consideration of a time lag (e.g. 0.1 second) from when a word is perceived until when a reaction appears in facial expression.

Figure 11:
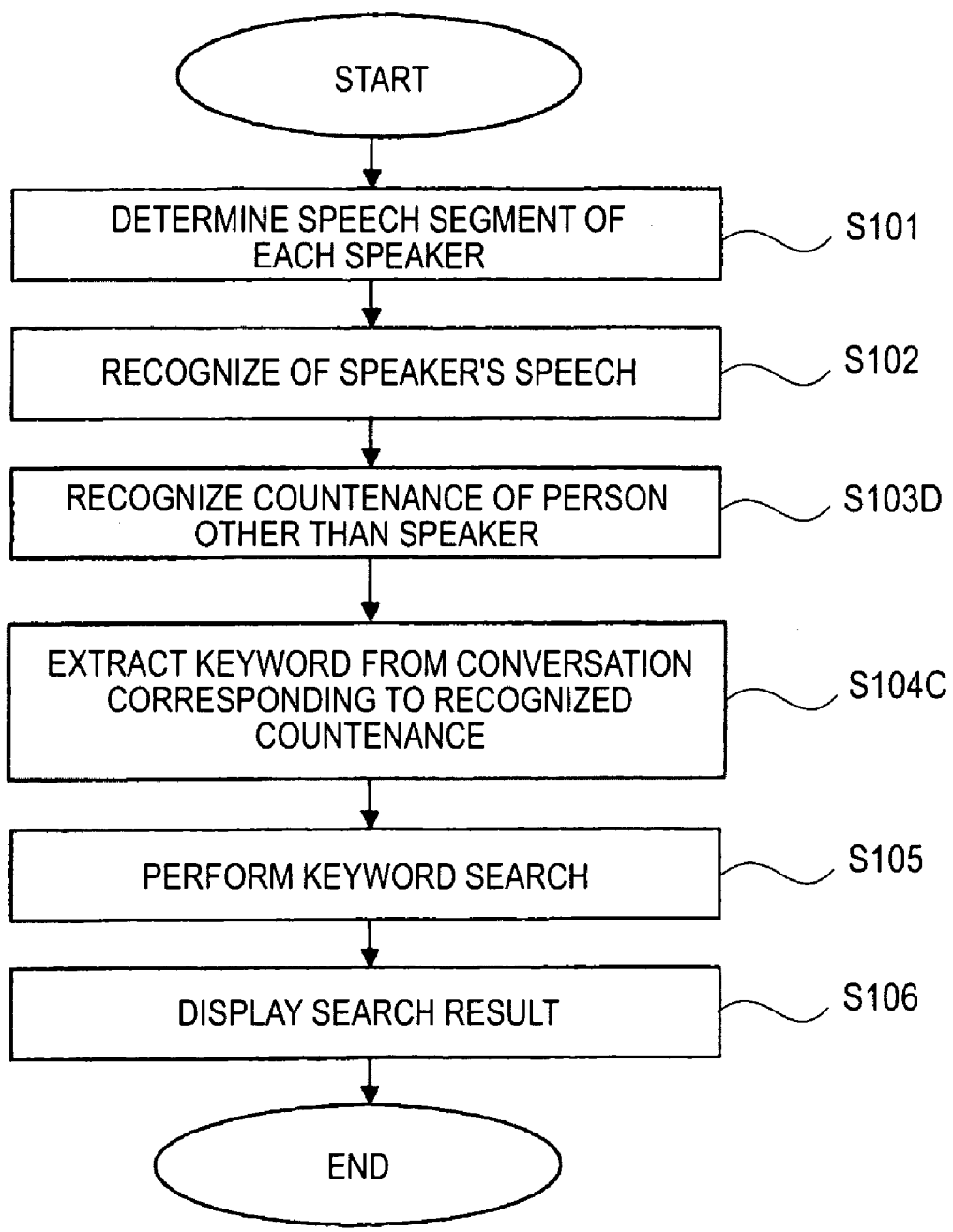
[FIG. 11] A flowchart showing operation of the keyword extracting device shown in FIG. 9.

Operation of the keyword extracting device 100C will now be described by reference to FIG. 11. In FIG. 11, an explanation is provided on the assumption that the speaker B will say "What's that?" by use of the information terminal 200 after the speaker A has talked "Tokyo Sky Tree will be constructed in future" by use of the keyword extracting device 100C. Processing pertaining to steps S101 to S102 and S105 to S106 in FIG. 11 is analogous to processing pertaining to steps S101 to S102 and S105 to S106 in FIG. 3, and hence their explanations are discretionarily omitted. Although voice and an image of the speaker B are input by use of the information terminal 200, an explanation is provided on the premise that the voice and image will be input from the audio input section 101 and the video input section 401 as with the speaker A.

The keyword extracting device 100C (the speech segment determination section 102) determines a speech segment (see the speech segment 1 and the speech segment 2 in FIG. 10) for each speaker in connection with the speech audio input from the audio input section 101 (step S101). The keyword extracting device 100C (the speech recognition section 103) recognizes speech sounds of the thus-determined speech segments for each speaker (step S102).

In the meantime, the keyword extracting device 100C (the video input section 401 and the facial expression recognition section 402) recognizes; for instance, the facial expression of the speaker B acquired at a time corresponding to the speech sound (see FIG. 10) of the speech segment 1 that is a preceding speech talked by the speaker A and the facial expression of the speaker A acquired at a time corresponding to the speech sound (see FIG. 10) of the speech segment 2 that is a subsequent speech talked by the speaker B. In short, there is recognized the facial expression of a person who is listening to speech sound; namely, the facial expression of another person responsive to speech sound of a speaker, rather than the facial expression of the speaker (step S103D).

Next, when perceived that the recognized facial expression is a neutral facial expression acquired at commencement of a speech and that the facial expression has changed to another facial expression in the middle of the speech, the keyword extracting device 100A (the keyword extraction section 105C) extracts a word uttered at a time corresponding to a point of change in facial expression as a keyword (step S104C). In the previously-described embodiment, the word "Tokyo Sky Tree" is extracted as a word corresponding to the time when the facial expression changed from a neutral facial expression to a surprised facial expression.

The keyword extracting device 100C (the keyword search section 106) causes the search server 300 to perform a search for the thus-determined keyword by way of the network 400 (step S105). Subsequently, the keyword search section 106 displays the received search result on the display section 107 (step S106). As a result, it becomes possible for the speaker to grasp information (a search result) pertaining to the word (e.g., Tokyo Sky Tree) that is the topic of conversation.

As mentioned above, according to the present embodiment, the keyword extracting device 100C extracts a keyword of conversation on the basis of a result of recognition of a facial expression of another person who is listing to speech sound. Therefore, the keyword extracting device 100C can extract a keyword of conversation on the basis of a characteristic of the speech response grasped as a change in facial expression without preparations; namely, advanced anticipation of a keywords employed in conversation and registration of the anticipated keywords in a database, and the like.

Even when the degree of opening of eyes, the degree of opening of the mouth, or the like, are converted into numerals and a change in facial expression is detected by means of only the magnitudes of changes in the numerals instead of facial expression recognition operation performed by the facial expression recognition section 402, similar advantages are yielded.

The fourth embodiment has described the case where the keyword extracting device 100C sequentially performs processing pertaining to steps S101 to S102, S103D, S104C, and S105 to S106 in FIG. 11; however, processing is not limited to the sequence. For instance, the keyword extracting device 100C may also perform processing by means of changing the sequence of processing pertaining to the respective steps shown in FIG. 11 or perform processing pertaining to the respective steps in parallel.

Fifth Embodiment

A keyword extracting device of a fifth embodiment extracts a keyword of conversation on the basis of an exciting reaction of a person who listened to speech sound.

Figure 12:
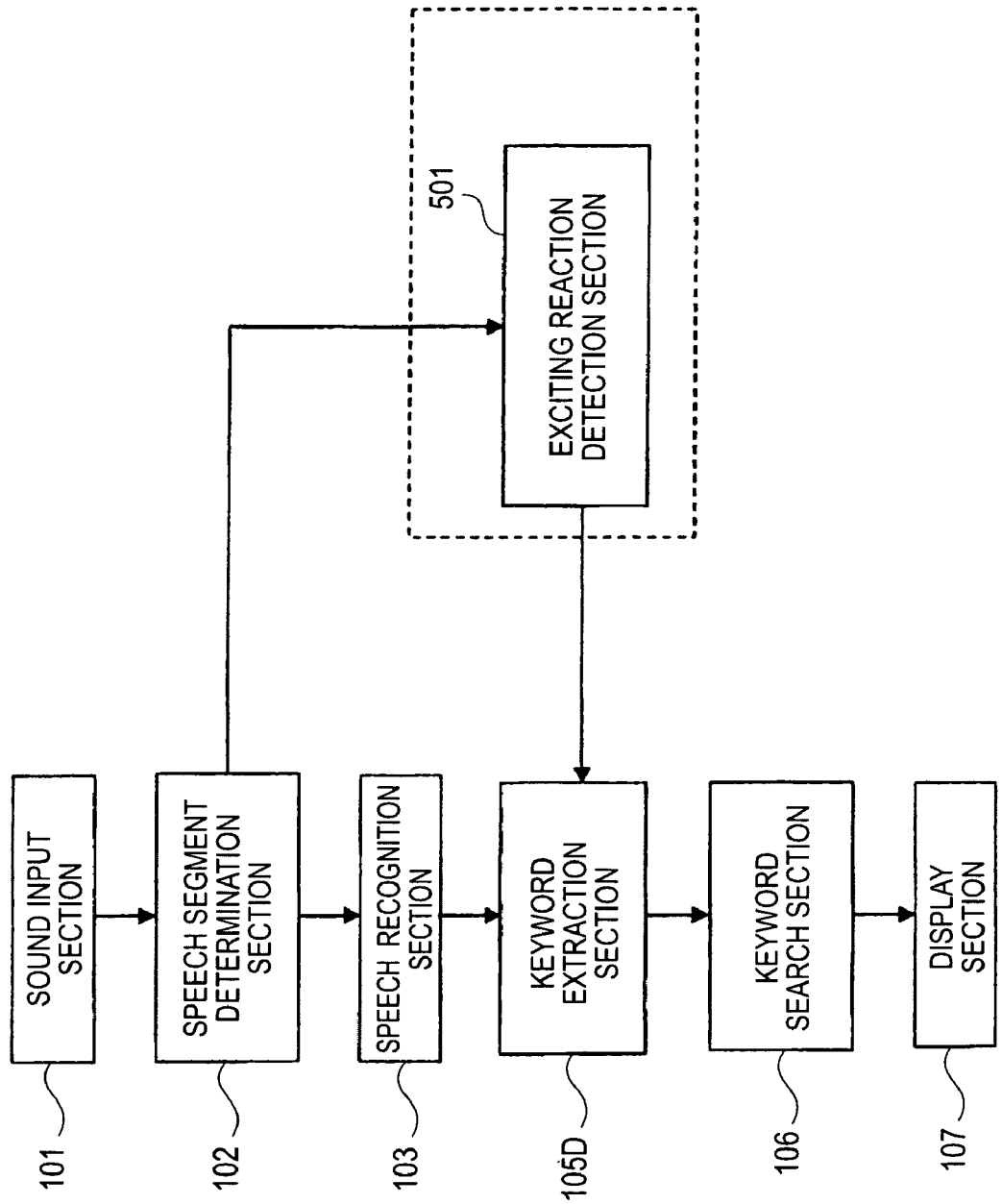
[FIG. 12] A block diagram showing an example configuration of a keyword extracting device of a fifth embodiment of the present invention.

FIG. 12 is a block diagram showing an example configuration of a keyword extracting device of the fifth embodiment of the present invention. In the fifth embodiment, elements which are the same as those of the first embodiment are assigned the same reference numerals and terms that are identical with those used in the first embodiment, and their repeated explanations are omitted.

In FIG. 12, a keyword extracting device 100D has an exciting reaction detection section 501 (which will also be called a "speech response feature extraction section") in lieu of the interrupt detection section 104 of the first embodiment shown in FIG. 1. Further, the keyword extracting device 100D is different from its counterpart of the first embodiment in having a keyword extraction section 105D in lieu of the keyword extraction section 105 of the first embodiment shown in FIG. 1. The exciting reaction detection section 501 is a processor, such as a CPU. In other respects, the configuration of an overall system including the information terminal 200 is analogous to that of the system shown in FIG. 1.

The exciting reaction detection section 501 detects exciting reaction from voice or sound. Specifically, exciting reaction is detected by detection of a laughing voice, sound with a high degree of excitement, sound caused by clapping the hands or slapping the knee, and the like. The exciting reaction detection section 501 prepares in advance learning samples in relation to a laughing voice, a clap of the hands, and the slap on the knee, to thus prepare a GMM (Gamma Mixture Model), and performs threshold processing by determining a likelihood for an input, thereby performing detection. Further, the exciting reaction detection section 501 detects a voice with a high degree of excitement by means of linearly connecting values, which have been determined as a result of normalization of a sound volume level, a pitch level, and the speed of speech by means of an average for a speaker, to thus convert the values into a numeral, and subjecting the numeral to threshold processing.

At that time, the exciting reaction detection section 501 regards, as exciting reaction responsive to speech, exciting reaction detected in the vicinity of an end of the speech segment determined by the speech segment determination section 102.

The keyword detection section 105D extracts a keyword from the speech corresponding to the exciting reaction.

Figure 13:
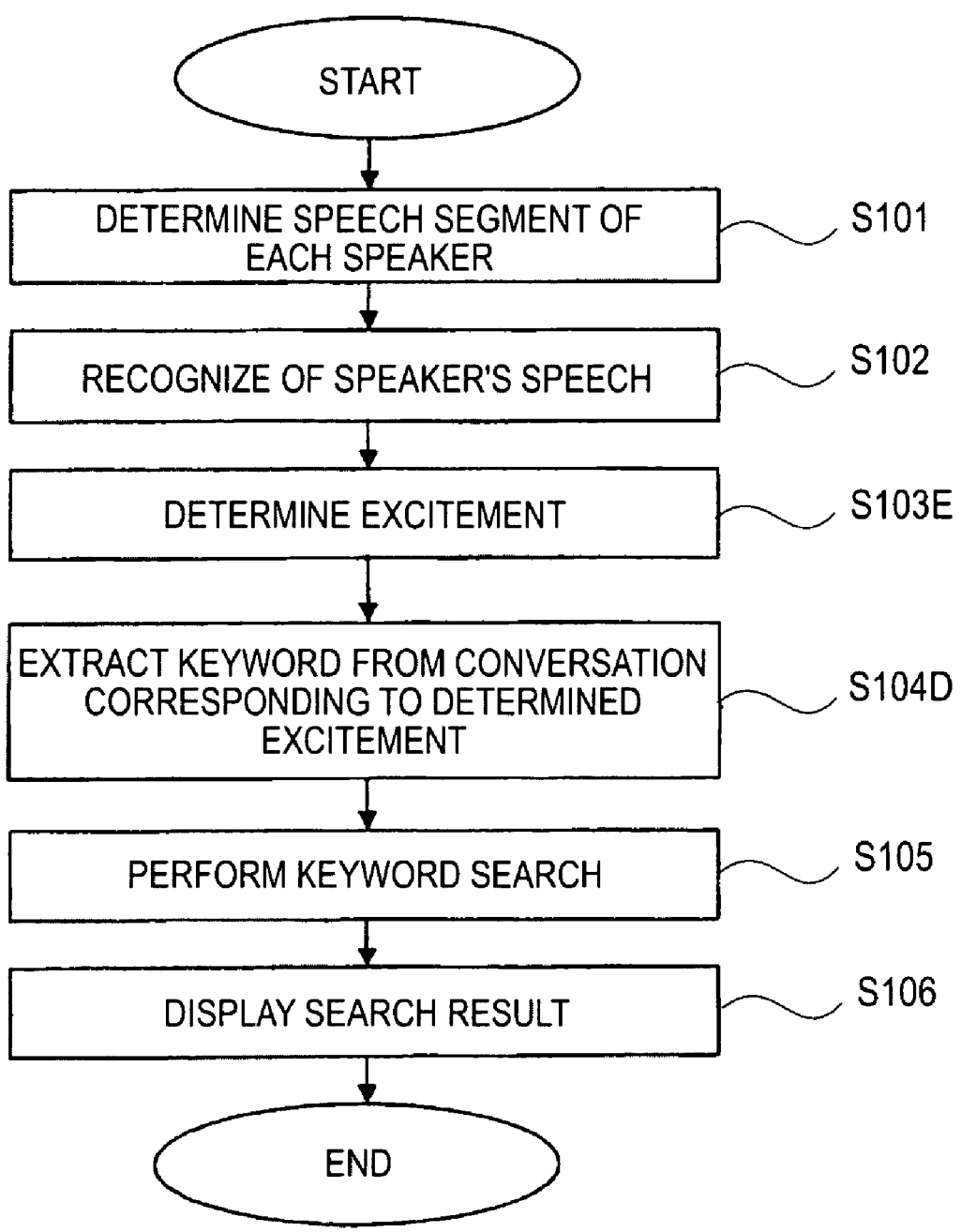
[FIG. 13] A flowchart showing operation of the keyword extracting device shown in FIG. 12.

Operation of the keyword extracting device 100D will now be described by reference to FIG. 13. In FIG. 13, an explanation is provided on the assumption that the speaker B will laugh "ha-ha-ha" by use of the information terminal 200 after the speaker A has talked "Tokyo Sky Tree will be ... in future" by use of the keyword extracting device 100D. Processing pertaining to steps S101 to S102 and S105 to S106 in FIG. 13 is analogous to processing pertaining to steps S101 to S102 and S105 to S106 in FIG. 3, and hence their explanations are discretionarily omitted.

The keyword extracting device 100D (the speech segment determination section 102) first determines a speech segment for each speaker in connection with the speech audio input from the audio input section 101 and the information terminal 200 (step S101). The keyword extracting device 100D (the speech recognition section 103) recognizes speech sounds of the thus-determined speech segments for each speaker (step S102).

The keyword extracting device 100D (the exciting reaction detection section 501) detects; for instance, presence of exciting reaction in the vicinity of a segment of speech uttered by the speaker A (step S103E). As a consequence, in the foregoing example of speech, GMM of a laughing voice is verified at a high likelihood immediately after the segment of the speech made by the speaker A, and hence the voice is detected as an exciting reaction.

The keyword extracting device 100D (the keyword extraction section 105D) next extracts, as a keyword, a word (e.g., "Tokyo Sky Tree") uttered in the segment of speech corresponding to the exciting reaction (step S104D).

The keyword extracting device 100D (the keyword search section 106) then causes the search server 300 to perform a search for the thus-determined keyword by way of the network 400 (step S105). Subsequently, the keyword search section 106 displays the received search result on the display section 107 (step S106). As a result, it becomes possible for the speaker to grasp information (a search result) pertaining to the word (e.g., Tokyo Sky Tree) that is the topic of conversation.

As mentioned above, according to the present embodiment, the keyword extracting device 100D extracts a keyword of conversation by detecting exciting reaction of a person who listened to speech sound. The keyword extracting device 100D can extract a keyword of conversation by means of a feature of speech response captured as excitement, such as a laughing voice or a clap of the hands, without preparations; namely, advanced anticipation of a keyword used in conversation and registration of the anticipated keywords in a database, and the like.

The fifth embodiment has described the case where the keyword extracting device 100D sequentially performs processing pertaining to steps S101 to S102, S103E, S104D, and S105 to S106 in FIG. 13; however, processing is not limited to the sequence. For instance, the keyword extracting device 100D may also perform processing by means of changing the sequence of processing pertaining to the respective steps shown in FIG. 13 or perform processing pertaining to the respective steps in parallel.

The first through third embodiments and the fifth embodiment have described the case where the keyword extracting device (the keyword extraction section) extracts, as a keyword, a noun at the end of a speech segment (at a point immediately before an interrupt), but the keyword is not limited to the noun. For instance, the keyword extraction section may also perform a search while taking, as a keyword, a noun of the conceptually-lowest level among a plurality of nouns included in a preceding speech that is a target of search. In this case, the keyword extracting device is additionally provided with a dictionary information storage section (not shown), such as memory, and the dictionary information storage section stores dictionary information including nouns of conceptually-high levels (e.g., Italian dishes) and nouns of conceptually-low levels (e.g., a pasta) that are classified and structured in a system. The keyword extraction section extracts, as a keyword, a noun of the conceptually-lowest level included in the dictionary information of the dictionary information storage section (not shown) from nouns included in speech that is a target of extraction. Thus, the noun of conceptually-low level is extracted as a keyword.

In the first through third embodiments and the fifth embodiment, the keyword extraction section may also extract, as a keyword, a noun of the highest pitch among nouns included in a speech that is a target of extraction or extract, as a keyword, a noun that is most frequently used. Alternatively, the keyword extraction section may also extract, as a keyword, a noun involving an optimum combination of a pitch of a noun with a parameter showing the number of times the noun is used (a previously-determined parameter pattern) from nouns included in a speech that is a target of extraction.

Although the present invention has been described in detail by reference to specific embodiments, it is manifest to those skilled in the art that the present invention is liable to various alterations and modifications without departing from the spirit and scope of the present invention.

The present patent application is based on Japanese Application (JP-A-2007-088321) filed on Mar. 29, 2007 in Japan, contents of which are incorporated herein for reference.

INDUSTRIAL APPLICABILITY

A keyword extracting device of the present invention is useful for extracting an important keyword included in conversation. The keyword extracting device can be applied to fields of application, such as a telephone, a vehicle-mounted terminal, a TV set, a conference system, a call center system, and a personal computer.

The invention claimed is:

1. A keyword extracting device, comprising:
an audio input section that inputs speech sound of a first speaker and a second speaker, wherein at least a start of the speech sound of the first speaker precedes a start of the speech sound of the second speaker, and the speech sound of the first and second speakers includes speech sound of a preceding speech and speech sound of a subsequent speech;
a speech segment determination section that determines respective first and second speech segments respectively corresponding to the first and second speakers in connection with the speech sound so as to separately identify speech sound from the first and second speakers;
a speech recognition section that recognizes respective speech sounds of the respective first and second speech segments determined for the first and second speakers;
a speech response feature extraction section that detects a speech response feature only from the second speech segment corresponding to the second speaker, the speech response feature indicates a presence of a keyword in the first speech segment corresponding to the first speaker based on the second speech segment as a response to the first speech segment of the first speaker; and
a keyword extraction section that extracts the keyword from the first speech segment specified by the speech response feature detected by the speech response feature extraction section, wherein the keyword extraction section extracts, as the keyword, a constituent element at the end of the first speech segment corresponding to the preceding speech prior to the speech response.

2. The keyword extracting device according to claim 1,
wherein the speech response feature extraction section includes an interrupt detection section that detects, on the basis of the first and second speech segments, an interrupt where the preceding speech and the subsequent speech overlap each other, when the second speech segment commences in a middle of the first speech segment; and
wherein the keyword extraction section extracts the keyword from the first speech segment corresponding to the preceding speech when the interrupt is detected.

3. The keyword extracting device according to claim 1,
wherein the speech response feature extraction section includes:
a pitch determination section that determines respective pitches of the speech sound of the preceding speech and the speech sound of the subsequent speech; and
a pattern determination section that determines, from the determined pitches, whether a pitch pattern including a descending pitch at an end of the preceding speech and an ascending pitch at a beginning of the subsequent speech is indicated; and
wherein the keyword extraction section extracts the keyword from the first speech segment corresponding to the preceding speech when the pitch pattern is indicated.

4. The keyword extracting device according to claim 1,
wherein the speech response feature extraction section detects a functional phrase of a predetermined type the second speech segment corresponding to the subsequent speech; and
wherein the keyword extraction section extracts the keyword from the first speech segment corresponding to the preceding speech which precedes the second speech segment, corresponding to the subsequent speech, that includes the detected functional phrase.

5. The keyword extracting device according to claim 1, wherein the speech response feature extraction section detects an exciting reaction of a person, other than the first and second speakers, located in a vicinity of the first and second speech segments respectively determined for the first and second speakers; and
wherein the keyword extraction section extracts the keyword from one of the first or second speech segments detected as corresponding to the exciting reaction.

6. The keyword extracting device according to claim 1, wherein the speech response feature extraction section recognizes facial expression of another speaker responsive to speech sounds of the first and second speakers and detects a point of change in the recognized facial expression; and
wherein, prior to the speech response, the keyword extraction section extracts, as a keyword, a constituent element at the end of the first speech segment corresponding to the detected point of change in facial expression.

* * * * *